United States Patent [19]
Favennec et al.

[11] Patent Number: 5,319,653
[45] Date of Patent: Jun. 7, 1994

[54] INTEGRATED OPTICAL COMPONENT STRUCTURE

[75] Inventors: Pierre-Noël Favennec, Lannion; Hélène L'Haridon, Ploulec'h; Danielle Moutonnet, Plumeur Bodou; Albert Barriere, Talence; Sébastien Raoux; Bruno Nombelli, both of Bordeaux, France

[73] Assignee: France Telecom, France

[21] Appl. No.: 979,659

[22] Filed: Nov. 19, 1992

[30] Foreign Application Priority Data

Nov. 20, 1991 [FR] France .................. 91 14303

[51] Int. Cl.$^5$ .............................................. H01S 3/30
[52] U.S. Cl. ........................................ 372/7; 372/39; 372/66
[58] Field of Search ............. 372/39, 41, 66, 7, 75, 372/69

[56] References Cited

U.S. PATENT DOCUMENTS

| | | | |
|---|---|---|---|
| 3,617,937 | 11/1971 | Mazelsky | 372/41 |
| 4,000,247 | 12/1976 | Yamada et al. | 372/41 |
| 4,782,494 | 11/1988 | Pollack et al. | 372/69 |
| 5,022,040 | 6/1991 | Pollack et al. | 372/69 |
| 5,038,358 | 8/1991 | Rand | 372/41 |
| 5,166,948 | 11/1992 | Gavrilovic et al. | 372/41 |

Primary Examiner—Leon Scott, Jr.
Attorney, Agent, or Firm—Blakely, Sokoloff, Taylor & Zafman

[57] ABSTRACT

An integrated optical component structure designed to operate at a rare earth ion fluorescence wavelength $\lambda_1$ comprises at least a thin layer of a mixed rare earth fluoride solid solution having the formula $(1-x)(M_{1-y}M'_y F_2)-x\ TRF_z$ deposited on a substrate of a monocrystalline semiconductor material where M and M' denote an alkaline earth ion, $TRF_z$ denotes a rare earth fluoride, x is in the range $]0,1[$ and y is in the range $[0,1]$. The component structure finds applications in telecommunications using optical waveguides.

21 Claims, 2 Drawing Sheets

$10\ ((1-x)(M_{1-y}M'_y F_2)-xTRF_z)$

INTEGRATED OPTICAL COMPONENT STRUCTURE

BACKGROUND OF THE INVENTION

1. Field of the Invention

The present invention concerns an integrated optical component structure designed to operate at a rare earth ion fluorescent wavelength $\lambda_1$. It also concerns a method of implementing a structure of this kind and various applications.

The invention has a particularly advantageous application in the field of optical waveguide telecommunications.

2. Description of the Prior Art

Diluted in a solid, rare earth ions fluoresce to emit visible light and near infrared due to electron transitions internal to their 4 f layer protected by their 5 s and 5 p layers. The erbium ion $Er^{3+}$ has a $^4I_{13/2} > ^4I_{15/2}$ radiative transition which is of particular interest because in this case the emitted wavelength $\lambda_2$ (1.54 $\mu$m) matches the minima of absorption and relative index variation $dn/d\lambda$ of silica optical waveguides.

A prior art integrated optical component structure as defined above comprises a silicon or III–V semiconductor material doped with erbium for example either by ionic implantation or by molecular beam epitaxy.

Investigation of this type of prior art structure has confirmed that the nature of the host material has little influence on the energy of radiation emitted by the rare earth ion.

On the other hand, it has been clearly established that the fluorescence yield as a function of the rare earth content increases at constant temperature in proportion to the forbidden energy band of the semiconductor material. To obtain at ambient temperature a yield comparable with that obtained at 77 K it would appear that a host matrix forbidden energy band of around 2.5 eV is required.

Furthermore, in the case of erbium at least, it has been shown that although initially the intensity of luminescence increases in proportion to the doping element concentration, a maximum is reached for concentrations as low as $10^{18}$ cm$^{-3}$. The decrease in fluorescence for high luminescent center concentrations is explained by the phenomena of cross relaxation and self-extinction by concentration. It is favored by the creation of atom ordering defects at the time of doping.

Thus the technical problem to be solved by the present invention is to provide an integrated optical component structure designed to operate at a rare earth ion fluorescence wavelength $\lambda_1$ which enables the aforementioned constraints and in particular that connected with the decrease in fluorescence at high concentrations to be eliminated.

SUMMARY OF THE INVENTION

According to the present invention, the solution to the stated technical problem consists in that said structure is constituted at least by a thin layer of a solid solution of a mixed rare earth fluoride with the formula $(1-x)(M_{1-y} M'_y F_2)$-$xTRF_3$ deposited onto a monocrystalline semiconductor material substrate where M and M' denote an alkaline earth ion, $TRF_3$ denotes a rare earth fluoride, x is in the range ]0,1[ and y is in the range [0,1].

In this case the host material consisting of an alkaline earth fluoride can have a very wide forbidden band, exceeding 10 eV in the case of calcium fluoride $CaF_2$, for example. Also, atom ordering defects responsible at least in part for the self-extinction by concentration phenomenon observed with conventional doping can be reduced because, as will be shown later in the case of erbium, for example, the rare earth is substituted for the alkaline earth cation(s) in the initial powders when said solid solution is formed.

It should also be emphasized that, photons being less energetic in fluorides than in oxides or semiconductors, such matrices favor fluorescent yield to the detriment of non-radiative recombinations.

Finally, it should be noted that the crystal system of $CaF_2$, $SrF_2$ and $BaF_2$ (fluorine type face-centered cubic) is very similar to those of the main semiconductors (diamond or zinc blende type face-centered cubic) and that their lattice parameters are very similar to those of silicon, InP and GaSb, respectively. Moreover, it has been established that it is possible to obtain in the form of thin films solid solutions of alkaline earth fluorides whose lattice parameter may be very accurately matched to that of various semiconductor substrates including GaAs.

However, the substitution of x alkaline earth cations with x rare earth ions and the addition of x fluorine ions to produce the mixed rare earth fluoride solid solution tends to modify the lattice parameter of the initial alkaline earth fluoride $M_{1-y} M'_y F_2$.

Thus a second technical problem to be solved by the present invention is to provide a method of producing an integrated optical component structure in accordance with the invention that can be used even with high molar fractions x of rare earth fluoride.

According to the present invention the solution to said second technical problem consists in a method which comprises the following steps:

preparing an initial powder of alkaline earth fluoride $M_{1-y} M'_y F_2$, preparing an initial powder of rare earth fluoride $TRF_3$, mixing said initial powders in a particular molar fraction x, producing a solid solution of mixed rare earth fluoride $(1-x) (M_{1-y} M'_y F_2)$-x $TRF_3$, epitaxially growing said thin film of solid solution on one face of said monocrystalline semiconductor material substrate.

Apart from the possibility of growing thin films of mixed rare earth solid solution epitaxially where the molar fraction x of rare earth fluoride may be as high as 20%, the method in accordance with the invention has other advantages including minimizing defects in the volume of the luminescent material (sources of extinction centers) and producing varied integrated optical components such as optical waveguides, microlasers and converter devices.

The following description with reference to the appended drawings given by way of non-limiting example will clearly demonstrate in what the invention consists and how it may be put into effect.

BRIEF DESCRIPTION OF THE DRAWINGS

FIG. 2b is a planar variant of the optical waveguide from FIG. 2a.

FIG. 3c is a planar second variant of the microlaser from FIG. 3a.

FIG. 5b is an integrated emitter variant of the converter device from FIG. 5a.

DETAILED DESCRIPTION OF THE INVENTION

Figure 1:
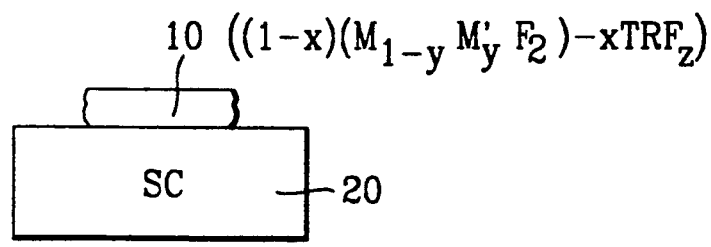
FIG. 1 is a view in cross-section of an integrated optical component structure in accordance with the invention.

FIG. 1 shows in cross-section an integrated optical component structure designed to operate at a rare earth ion fluorescence wavelength $\lambda_1$. This structure comprises a thin film 10 of a mixed rare earth fluoride solid solution having the formula

$(1-x)(M_{1-y}M'_y F_2) \cdot x\, TRF_3$

M and M' denoting an alkaline earth ion such as $Ca^{2+}$ or $Sr^{2+}$, $TRF_3$ denoting a rare earth fluoride, x being in the range ]0,1[ and y being in the range [0,1].

The thin film 10 is deposited on a substrate 20 of a monocrystalline semiconductor material such as silicon or a III-V compound such as GaAs, GaSb, InP, etc.

It is to be understood that the integrated optical component structure in accordance with the invention may comprise a plurality of thin films of mixed rare earth fluoride solid solutions. Structures with three successive thin films will be described later with reference to a few application examples.

The integrated optical component structure in FIG. 1 is obtained by a method that will now be described in the example of a solid solution containing erbium fluoride:

$(1-x)\, CaF_2 - x\, ErF_3.$

An initial powder of calcium fluoride $CaF_2$ is prepared from commercially available fluoride refluorinated in an atmosphere of fluorine immediately before it is used in order to eliminate any traces of oxides and water vapor that it may contain.

The initial powder of erbium fluoride $ErF_3$ is prepared from commercially available oxide $Er_2O_3$. The experimental procedure is as follows: the oxide is heated to 100° C. in a fluorine atmosphere to eliminate all traces of water vapor and then heated to 800° C. in a high-frequency oven in a flow of gaseous HF.

The powder obtained is mixed in a particular molar fraction x determined by weighing the initial powders in a dry box in a nitrogen atmosphere. After homogenization, the mixture is heated to 200° C. in a primary vacuum inside a platinum tube in order to eliminate all traces of adsorbed gas. Finally the tube is sealed and heated to 1 100° C. for fifteen hours before it is quenched. The tube then contains the required solid solution $(1-x)\, CaF_2$-$xErF_3$ which may also be written $Ca_{1-x}\, Er_x\, F_{2+x}$.

Radiocrystallographic analysis of the solid solution obtained provides a way of checking that all of the mixture of the initial powders has been converted into alloy and, by displacement of the diffraction peaks, that the molar fraction x is the same as that chosen beforehand, which is also verified by backscattering of high-energy ions (RBS). It is therefore possible to verify that the solid solution obtained under the conditions described previously is made up of a single fluorine type phase whose lattice parameter increases in a substantially linear fashion with the molar fraction x. This expansion of the initial calcium fluoride lattice is due essentially to the introduction of additional $F^-$ ions into interstitial sites whereas replacement of the $Ca^{2+}$ ion by the smaller $Er^{3+}$ ion tends to shrink the $CaF_2$ lattice.

There have been obtained in this way solid solutions of $Ca_{1-x}\, Er_x\, F_{2+x}$ whose molar fraction x of erbium fluoride was greater than 10% and up to 20%. Even for high values of the parameter x, catholuminescence studies using visible light have shown that the emission from the solid solutions was homogeneous, indicating good interdiffusion of the initial constituents $CaF_2$ and $ErF_3$.

The substrates of monocrystalline semiconductor material (silicon, for example) are degreased (trichloroethylene, acetone, methanol, trichloroethylene, methanol, de-ionized water), oxidized ($HNO_3$), de-oxidized ($HF-C_2H_5OH$, 1:10), held in a bath of de-ionized water and then introduced into the preparation chamber of an epitaxy reactor where they undergo a final de-oxidization ($HF-C_2H_5OH$) in an inert atmosphere ($N_2$). After mounting on the sample-holders, the substrates are transferred into the epitaxy chamber where the solid solution thin films are deposited after surface reconstruction (heating to 900° for thirty minutes) and monitored by diffraction of high-energy electrons (RHEED, 10 keV).

The thin films are then grown epitaxially onto one face of the substrate, the [100] crystal face, for example, under the following conditions:

limiting vacuum prior to heating of platinum crucibles containing the solid solution: $3.10^{-11}$ Torr, temperature of substrates during growth: $T_S = 450°$ C., powder sublimation temperature: 1 100° C. approx, vapor condensation rate: $V_C = 10^{-1}$ nm/s (monitored by piezoelectric quartz crystal balance), final pressure: $10^{-9}$ Torr.

After the deposits are formed the samples are recovered in air or mounted in an analysis chamber for "in situ" characterization tests. Scanning electron microscope examination has shown that the thin films obtained are homogeneous, compact and adhere well to the substrates. Also, the X-ray diffraction spectra of the residual powders collected in the crucible after evaporation do not show any apparent modification relative to the initial spectra. Heating to the sublimation temperature seems therefore not to have modified the composition of the solid solution, as shown by the RBS spectra.

Finally, irrespective of the value of the substitution factor x between 4 and 20%, the thin films are characterized by intense fluorescence representing mainly:

for visible light, the following transitions:

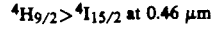
$^4H_{9/2} > {}^4I_{15/2}$ at 0.46 μm $^4S_{3/2} > ^4I_{15/2}$ at 0.55 μm $^4F_{9/2} > ^4I_{15/2}$ at 0.66 μm for near infrared, the following transitions:

$^4I_{11/2} > ^4I_{15/2}$ at 0.98 μm $^4I_{13/2} > ^4I_{15/2}$ at 1.54 μm

The method described above refers only to the $Ca_{1-x} Er_x F_{2+x}$ solid solution on Si[100]. Identical results have been obtained with $(1-x)SrF_2 - xErF_3/InP[100]$ or $(1-x)(Sr_{1-y}Ca_yF_2)-xErF_3/GaAs[100]$ Applications of the integrated optical component structure in accordance with the invention will now be described with reference to FIGS. 2a through 5b.

Figure 2A:
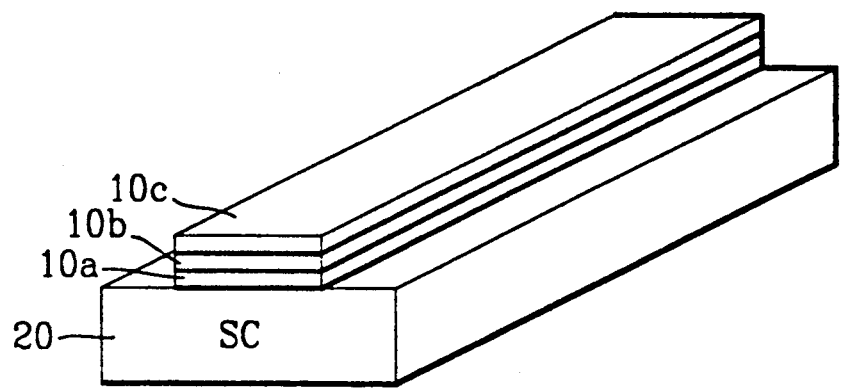
FIG. 2a is a perspective view of a laser type optical waveguide having a structure similar to that of FIG. 1.
Figure 2B:
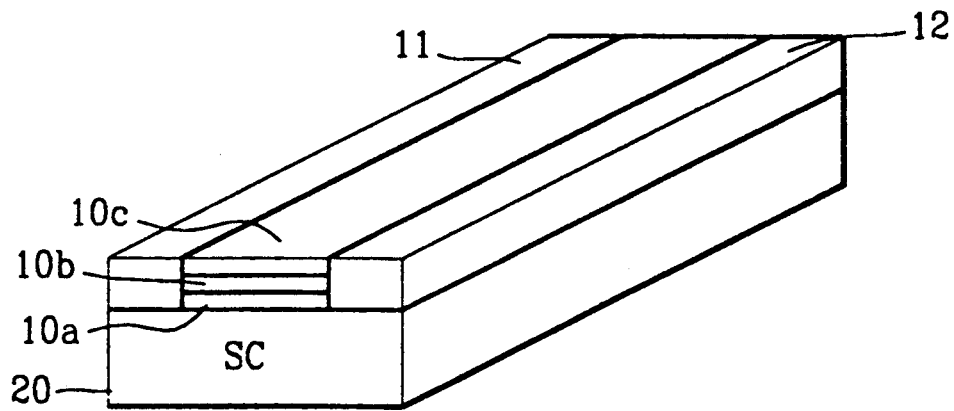

FIGS. 2a and 2b show in perspective two integrated optical components which have the same guide structure each comprising a structure analogous to that of FIG. 1 comprising a first microstrip thin film 10a with index $n_a$ of a first solid solution of mixed rare earth (erbium, for example) fluoride deposited onto the monocrystalline semiconductor material substrate 20, a second microstrip thin film 10b of index $n_b$ greater than $n_a$ of a second mixed erbium fluoride solid solution deposited on said first thin film 10a and a third medium 10c of index $n_c$ less than $n_b$. In the example of FIGS. 2a and 2b this third medium 10c is a third microstrip thin film of a third mixed erbium fluoride solid solution deposited on said second thin film 10b. Of course, said third medium could be the ambient air.

The values of the various indices are obtained by adjusting the rare earth composition of each of the solid solutions. In the case of $Ca_{1-x}Er_xF_{2+x}$, for example, it has been shown that the index can vary from 1.43 through 1.47 when x varies from 4 through 20%. To be more precise, it is feasible to consider a guide structure in which the three thin films 10a, 10b and 10c are 1 μm thick, the molar fraction x of the these layers being respectively 0.035, 0.200 and 0.035. The substrate is selected from Si, InP and GaAs. A component with a guide structure of this kind operates at least at the following wavelengths $\lambda_1$ of erbium: 0.66 μm, 0.98 μm and 1.54 μm.

In the specific embodiment of the optical waveguide from FIG. 2a the first, second and third microstrip thin films 10a, 10b and 10c form a mesa type microstrip.

In the embodiment shown in FIG. 2b the first, second and third microstrip films 10a, 10b and 10c form a planar type microstrip with two microstrip lateral layers 11 and 12 of said first or third mixed rare earth fluoride solid solution.

FIGS. 3a through 4b show various embodiments of a microlaser comprising an integrated optical component having a guide structure as previously described in which the first, second and third thin films 10a, 10b and 10c are placed between two mirrors forming a cavity. Said microlaser further comprises means for optical pumping of said rare earth which in the examples of FIGS. 3a through 3d are external means (not shown) such as a 0.488 μm argon laser, for example.

Figure 3A:
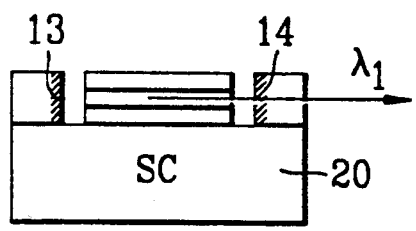
FIG. 3a is a view in cross-section of a mesa type microlaser having a structure similar to that of FIG. 1 and external mirrors.
Figure 3B:
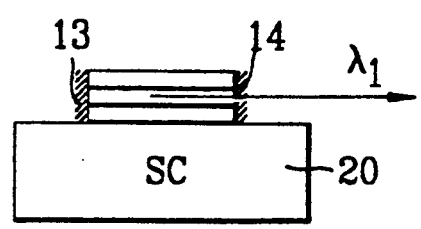
FIG. 3b is a first variant of the microlaser from FIG. 3a comprising lateral surface mirrors.
Figure 3C:
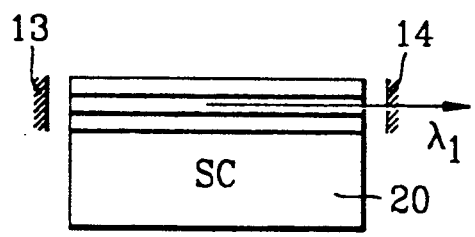
Figure 3D:
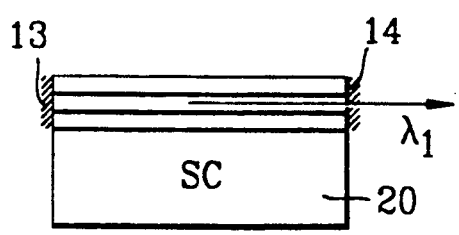
FIG. 3d is a planar third variant of the microlaser from FIG. 3a comprising lateral surface mirrors.

The microlasers of FIGS. 3a and 3b have a mesa type structure whereas those shown in FIGS. 3c and 3d are of the planar type.

The mirrors 13, 14 may be disposed externally of the thin films as in FIGS. 3a and 3c or consist in thin metal films deposited onto the lateral surfaces of the microstrip thin film as shown in FIGS. 3b and 3d.

Note that these microlasers operate at ambient temperature and that the emission wavelength $\lambda_1$ (1.54 μm in the case of erbium, for example) is constant irrespective of the temperature. The semiconductor substrate 20 is inactive in this example, serving merely as a support.

Figure 4A:
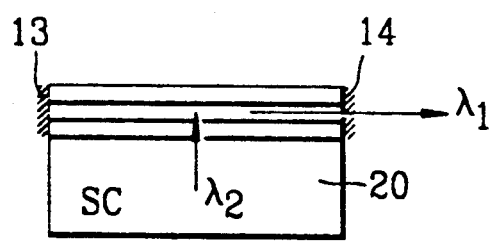
FIG. 4a is a view in cross-section of a microlaser similar to that from FIG. 3d comprising an integrated excitation source.

On the other hand, in the FIG. 4a microlaser the semiconductor substrate 20 itself constitutes the pumping means in the form of an electrically controlled laser diode or LED emitting at a wavelength $\lambda_2$ equal to 0.66 μm or 0.98 μm if the rare earth is erbium. It is also possible to use the 0.488 μm wavelength of a diode emitting blue light. Generally speaking, the wavelength $\lambda_2$ must be such as to produce absorption in the solid solution thin films.

Said pumping means preferably emit via the surface and excite the rare earth impurities contained in the solid solution thin films. In the guide structure the light at the wavelength $\lambda_1$ (1.54 μm in the case of erbium) can cause lasting action in an appropriate structure, in particular with lateral mirrors 13, 14 present to form the resonant cavity.

Figure 4B:
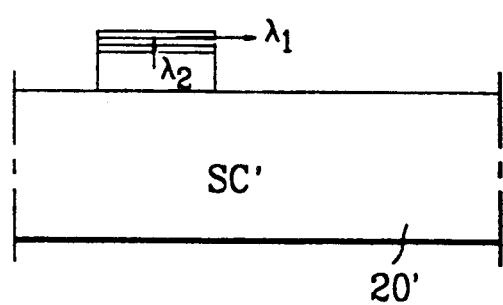
FIG. 4b is a view in cross-section of the microlaser from FIG. 4a integrated on a substrate.

The FIG. 4b diagram shows an integrated component in which the microlaser from FIG. 4a is put onto a semiconductor substrate 20' which can receive other elements adapted to cooperate with said microlaser.

Figure 5A:
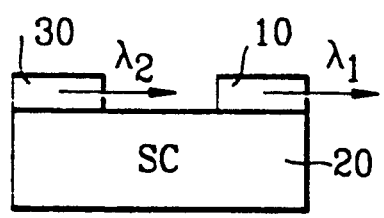
FIG. 5a is a view in cross-section of an external emitter converter device having a structure similar to that of FIG. 1.

FIG. 5a is a diagram of an optical converter device having a structure analogous to that described with reference to FIG. 1. This device includes control means 30 producing radiation at a wavelength $\lambda_2$ less than $\lambda_1$ which excites the rare earth ions in the thin film 10 which then emits at the wavelength 80 $_1$. In the FIG. 5a example the drive means 30 may be an external laser such as a laser diode emitting at 0.488 μm.

Figure 5B:
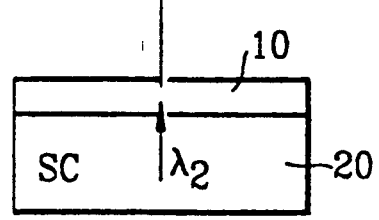

In the embodiment shown diagrammatically in figure 5b the control means of the converter device comprise the semiconductor material substrate 20 itself, as in the case of the microlaser with integrated pumping means.

There is claimed:

1. An integrated optical component structure which produces radiation at a rare earth ion fluorescence wavelength $\lambda_1$ comprising at least a thin layer of a mixed rare earth fluoride solid solution having the formula $(1-x)(M_{1-y} M'_y F_2)$-x $TRF_3$ deposited on a substrate of a monocrystalline semiconductor material where M and M' denote an alkaline earth ion, $TRF_3$ denotes a rare earth fluoride, x is in the range (0,1) and y is in the range (0,1).

2. An integrated optical component structure according to claim 1 wherein said wavelength $\lambda_1$ represents the $^4I_{13/2} > ^4I_{15/2}$ transition at 1.54 μm of the erbium ion $Er^{3+}$.

3. An integrated optical component structure according to claim 1 wherein the molar fraction x of rare earth fluoride $TRF_z$ is in the range (0,0.2).

4. An integrated optical component structure according to claim 1 wherein said monocrystalline semiconductor material is silicon.

5. An integrated optical component structure according to claim 1 wherein said monocrystalline semiconductor material is a III-V compound.

6. A method of producing an integrated optical component structure designed to operate at a rare earth ion fluorescence wavelength $\lambda_1$ comprising at least a thin layer of a mixed rare earth fluoride solid solution having the formula $(1-x)(M_{1-y}M'_yF_2)$-x $TRF_3$ deposited on a substrate of a monocrystalline semiconductor material where M and M' denote an alkaline earth ion, $TRF_3$ denotes a rare earth fluoride, x is in the range (0, 1) and y is in the range (0,1), said method comprising the following stages:

preparing an initial powder of alkaline earth fluoride $M_{x-y}M'_yF_2$, preparing an initial powder of rare earth fluoride $TRF_3$, mixing said initial powders in a particular molar fraction x, producing a mixed rare earth fluoride solid solution $(1-x)(M_{1-y}M'_yF_2)$-x$TRF_3$ by heating said mixture at high temperature, epitaxially growing said solid solution thin film on a surface of said monocrystalline semiconductor material substrate.

7. A method according to claim 6 wherein said surface is a (100) crystal face.

8. A integrated optical component having a guide structure comprising an integrated optical component structure designed to operate at a rare earth ion fluorescence wavelength $\lambda_1$ comprising at least a thin layer of a mixed rare earth fluoride solid solution having the formula $(1-x)(M_{1-y}M'_y F_2)$-x $TRF_3$ deposited on a substrate of a monocrystalline semiconductor material where M and M' denote an alkaline earth ion, $TRF_3$ denotes a rare earth fluoride, x is in the range (0,1) and y is in the range (0,1), said component including a first microstrip thin film of index $n_a$, a first mixed rare earth solid solution deposited on said monocrystalline semiconductor material substrate, a second microstrip thin film of index $n_b$ greater than $n_a$, a second mixed rare earth solid solution deposited on said first thin film and a third medium of index $n_c$ less than $n_b$.

9. An integrated optical component according to claim 8 wherein said third medium comprises a third microstrip thin film of a third mixed rare earth fluoride solid solution deposited on said second thin film.

10. An Optical waveguide comprising an integrated optical component having a guide structure comprising an integrated optical component structure which produces radiation at a rare earth ion fluorescence wavelength $\lambda_1$ comprising at least a thin layer of a mixed rare earth fluoride solid solution having the formula $(1-x)(M_{1-y}M'_yF_2)$-x $TRF_3$ deposited on a substrate of a monocrystalline semiconductor material where M and M' denote an alkaline earth ion, $TRF_3$ denotes a rare earth fluoride, x is in the range (0,1) and y is in the range (0,1), said component including a first microstrip thin film of index $n_a$, first mixed rare earth solid solution deposited on said monocrystalline semiconductor material substrate, a second microstrip thin film of index $n_b$ greater than $n_a$, a second mixed rare earth solid solution deposited on said first thin film and a third medium of index $n_c$ less than $n_b$ wherein said third medium comprises a third microstrip thin film of a third mixed rare earth fluoride solid solution deposited on said second thin film and wherein said first, second and third microstrip thin films form a mesa type microstrip.

11. An optical wave guide comprising an integrated optical component structure which produces radiation at a rare earth ion fluorescence wavelength $\lambda_1$ comprising at least a thin layer of a mixed rare earth fluoride solid solution having the formula $(1-x)(M_{1-y}M'_yF_2)$-x $TRF_3$ deposited on a substrate of a monocrystalline semiconductor material where M and M' denote an alkaline earth ion, $TRF_3$ denotes a rare earth fluoride, x is in the range (0,1) and y is in the range (0,1), said component including a first microstrip thin film of index $n_a$, first mixed rare earth solid solution deposited on said monocrystalline semiconductor material substrate, a second microstrip thin film of index $n_b$ greater than $n_a$, a second mixed rare earth solid solution deposited on said first thin film and a third medium of index $n_c$ less than $n_b$ wherein said third medium comprises a third microstrip thin film of a third mixed rare earth fluoride solid solution deposited on said second thin film and wherein said first, second and third microstrip thin films form a planar type microstrip with two microstrip lateral layers of said first or third mixed rare earth fluoride solid solution.

12. A microlaser comprising an integrated optical component having a guide structure comprising an integrated optical component structure which produces radiation at a rare earth ion fluorescence wavelength $\lambda_1$ comprising at least a thin layer of a mixed rare earth fluoride solid solution having the formula $(1-x)(M_{1-y}M'_yF_2)$-x $TRF_3$ deposited on a substrate of a monocrystalline semiconductor material where M and M' denote an alkaline earth ion, $TRF_3$ denotes a rare earth fluoride, x is in the range (0,1) and y is in the range (0,1), said component including a first microstrip thin film of index $n_a$, a first mixed rare earth solid solution deposited on said monocrystalline semiconductor material substrate, a second microstrip thin film of index $n_b$ greater than $n_a$, a second mixed rare earth solid solution deposited on said first thin film and a third medium of index $n_c$ less than $n_b$ wherein said third medium comprises a third microstrip thin film of a third mixed rare earth fluoride solid solution deposited on said second thin film and wherein said first, second and third microstrip thin films are disposed between two mirrors defining a cavity and further comprising means for optically pumping said rare earth.

13. A microlaser according to claim 12 wherein said mirrors are disposed externally of said thin films.

14. A microlaser according to claim 12 wherein said mirrors are metal thin films deposited on the lateral faces of said mixed rare earth fluoride solid solution thin films.

15. A microlaser according to claim 12 wherein said optical pumping means for optically pumping said rare earth are external to said integrated optical component.

16. A microlaser according to claim 12 wherein said optical pumping means for optically pumping said rare earth comprise said monocrystalline semiconductor material substrate.

17. A microlaser according to claim 16 wherein said monocrystalline semiconductor material substrate is selected from a light-emitting diode and a laser diode.

18. An optical converter device comprising an integrated optical component structure which produces radiation at a rare earth ion fluorescence wavelength $\lambda_1$ comprising at least a thin layer of a mixed rare earth fluoride solid solution having the formula $(1-x)(M_{1-y}M'_yF_2)$-x $TRF_3$ deposited on a substrate of a monocrystalline semiconductor material where M and M' denote an alkaline earth ion, $TRF_3$ denotes a rare earth fluoride, x is in the range (0,1) and y is in the range (0,1), and a control means which produces radiation at a wavelength $\lambda_2$ less than $\lambda_1$, said radiation at the $\lambda_2$ wavelength being directed at said optical component structure which then emits at the $\lambda_1$ wavelength.

19. A device according to claim 18 wherein said control means comprise an external laser.

20. A device according to claim 18 wherein said control means comprise said monocrystalline semiconductor material substrate.

21. A device according to claim 20 wherein said monocrystalline semiconductor material substrate is selected from a light-emitting diode and a laser diode.

* * * * *

UNITED STATES PATENT AND TRADEMARK OFFICE
CERTIFICATE OF CORRECTION

PATENT NO. : 5,319,653
DATED : June 7, 1994
INVENTOR(S) : Favennec et al.

It is certified that error appears in the above-indentified patent and that said Letters Patent is hereby corrected as shown below:

```
In Claim 10 in column 7 at line 45 change "Optical" to
--optical--.
```

Signed and Sealed this

Nineteenth Day of March, 1996

Attest:

BRUCE LEHMAN

*Attesting Officer*    *Commissioner of Patents and Trademarks*

UNITED STATES PATENT AND TRADEMARK OFFICE
CERTIFICATE OF CORRECTION

PATENT NO. : 5,319,653

DATED : Jun. 7, 1994

INVENTOR(S) : Favennec et al.

It is certified that error appears in the above-identified patent and that said Letters Patent is hereby corrected as shown below:

On title page, item [75] change:
Inventors: Pierre-Noel Favennec, Lannion;
Helene L'Haridon, Ploulec'h;
Danielle Moutonnet, Plumeur Bodou;
Albert Barriere, Talence; Sebastien Raoux; Bruno Nombelli, both of Bordeux, France to:
Inventors: Pierre-Noel Favennec, Lannion;
Helene L'Haridon, Ploulec'h;
Danielle Moutonnet, Plumeur Bodou;
Albert Barriere, Talence; Sebastien Raoux; Bruno Mombelli, both of Bordeux, France Signed and Sealed this Third Day of September, 1996

*Attest:*

BRUCE LEHMAN

*Attesting Officer*         *Commissioner of Patents and Trademarks*